United States Patent
Kumar (10) Patent No.: US 9,146,748 B1
(45) Date of Patent: Sep. 29, 2015

(54) SYSTEMS AND METHODS FOR INJECTING DRIVERS INTO COMPUTING SYSTEMS DURING RESTORE OPERATIONS

(71) Applicant: Symantec Corporation, Mountain View, CA (US)

(72) Inventor: Manish Kumar, Bhurkunda (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/338,348

(22) Filed: Jul. 23, 2014

(51) Int. Cl.
*G06F 9/445* (2006.01)
*G06F 9/44* (2006.01)
*G06F 11/14* (2006.01)

(52) U.S. Cl.
CPC ............... *G06F 9/4411* (2013.01); *G06F 8/61* (2013.01); *G06F 11/1402* (2013.01); *G06F 11/1469* (2013.01)

(58) Field of Classification Search
CPC .... G06F 8/61; G06F 11/1469; G06F 11/1402
USPC .......................................... 717/174; 707/674
See application file for complete search history.

(56) References Cited

U.S. PATENT DOCUMENTS

| | | | | |
|---|---|---|---|---|
| 5,469,573 | A * | 11/1995 | McGill et al. | 717/127 |
| 7,480,823 | B2 * | 1/2009 | Awasthi et al. | 714/15 |
| 7,650,531 | B2 * | 1/2010 | Yeung et al. | 714/5.1 |
| 7,831,968 | B1 * | 11/2010 | Weathersby et al. | 717/174 |
| 8,712,968 | B1 * | 4/2014 | Chester et al. | 707/649 |
| 2005/0060607 | A1 * | 3/2005 | Kano | 714/15 |
| 2005/0071270 | A1 * | 3/2005 | Ramirez et al. | 705/50 |
| 2008/0276123 | A1 * | 11/2008 | Sudhakar et al. | 714/6 |
| 2013/0061228 | A1 * | 3/2013 | Prasad et al. | 718/100 |

OTHER PUBLICATIONS

"Microsoft Deployment Toolkit", https://technet.microsoft.com/en-us/windows/dn475741.aspx, as accessed May 28, 2014, (Oct. 24, 2013).
"Deployment Image Servicing and Management (DISM)", https://msdn.microsoft.com/en-us/library/windows/desktop/dd371719(v=vs.85).aspx, as accessed May 28, 2014, Microsoft, (Aug. 10, 2012).
"AppAssure", http://www.appassure.com/, as accessed May 28, 2014, Dell Inc., (Jul. 30, 2003).
"Acronis", http://www.acronis.com/en-us/, as accessed May 28, 2014, (Feb. 25, 2014).

* cited by examiner

*Primary Examiner* — Phillip H Nguyen
(74) *Attorney, Agent, or Firm* — ALG Intellectual Property, LLC (57) ABSTRACT

The disclosed computer-implemented method for injecting drivers into computing systems during restore operations may include (1) identifying a restore operation directed to restoring a system volume on a computing system, (2) locating, at least in part by examining a hardware configuration of the computing system being restored, at least one driver utilized by the hardware configuration, (3) representing the system volume as an image to a deployment image servicing and management application, and (4) causing the deployment image servicing and management application to inject the driver into the computing system as part of the restore operation. Various other methods, systems, and computer-readable media are also disclosed.

20 Claims, 7 Drawing Sheets

SYSTEMS AND METHODS FOR INJECTING DRIVERS INTO COMPUTING SYSTEMS DURING RESTORE OPERATIONS

BACKGROUND

Computing devices may be configured with a wide and ever-growing variety of hardware and/or connected to a plethora of peripherals. These hardware devices and peripherals are typically managed by scripts known as device drivers and may not be usable without the correct driver. Each piece of hardware or peripheral may have its own driver, which may be customized or tailored for each operating system the hardware may be connected to. Even virtual devices may use drivers to interact with operating systems.

Early systems for installing drivers often required users to have access to physical media, such as a compact disk, that came with the hardware. More modern systems may automatically inject drivers into the operating system during device installation. However, drivers may be lost during computing system crashes or may not be available from their original sources if a computing environment is restored onto different hardware than the computing environment was originally generated on.

Traditional systems for restoring system volumes typically involve injecting drivers into an offline version of a volume after the volume has been restored. However, these systems often use specific code that is tailored to the hardware configuration and/or operating system of the device in question, increasing the difficulty and complexity of maintaining proper driver configurations. Vendors of an operating system also often change which registry keys are updated upon driver injection, requiring the applications that inject these drivers to be rewritten each time.

In some traditional systems, Deployment Image Servicing and Management (DISM) applications may be used to inject drivers before the volume is deployed to a target device. However, anticipating the future hardware configurations of computing systems that have not yet been deployed may be very difficult, making it unlikely that the correct combination of drivers may be installed in advance. Accordingly, the instant disclosure identifies and addresses a need for additional and improved systems and methods for injecting drivers into to-be-restored volumes.

SUMMARY

As will be described in greater detail below, the instant disclosure describes various systems and methods for using DISM applications to inject drivers into deployed system volumes during restore operations in a hardware-agnostic fashion. In one example, a computer-implemented method for performing such a task may include (1) identifying a restore operation directed to restoring a system volume on a computing system, (2) locating, at least in part by examining a hardware configuration of the computing system being restored, at least one driver utilized by the hardware configuration, (3) representing the system volume as an image to a DISM application, and (4) causing the DISM application to inject the driver into the computing system as part of the restore operation.

The driver may be located in a variety of ways. In some examples, locating the driver may include locating an identifier of the driver in a driver database and retrieving the driver from the driver database. In some examples, locating the driver may include retrieving the driver from a driver store maintained by a restore application that is performing the restore operation. Additionally or alternatively, locating the driver may include prompting a user for a location of the driver.

In some examples, examining the hardware configuration of the computing system may include examining the hardware configuration during the restore operation. Additionally or alternatively, the step of examining the hardware configuration may occur after deployment of the system volume to the computing system, such that the steps of locating and injecting the driver may be hardware agnostic.

In some examples, identifying the restore operation directed to restoring the system volume may include detecting, on the system volume, a file structure that is characteristic of the system volume. In one embodiment, the step of locating the driver may be contingent on determining that the restore operation is directed to restoring the system volume and not a data volume.

In some examples, causing the DISM application to inject the driver may include interacting with the DISM application via an application programming interface. In one embodiment, the step of causing the DISM application to inject the driver into the computing system may occur after deployment of the system volume to the computing system.

In one embodiment, the computer-implemented method may further include determining that the driver represents an incorrect driver for the hardware configuration. In this case, the systems described herein may automatically restart the restore operation, locate a correct driver for the hardware configuration, and cause the DISM application to inject the correct driver.

In one example, the computer-implemented method may further include identifying an additional restore operation on an additional computing system. In this example, the systems described herein may (1) determine that the additional computing system includes a different hardware configuration that does not utilize the driver and (2) remove, as part of the additional restore process, the driver that is not utilized by the different hardware configuration.

In one embodiment, a system for implementing the above-described method may include (1) an identification module, stored in memory, that identifies a restore operation directed to restoring a system volume on a computing system, (2) a location module, stored in memory, that locates, at least in part by examining a hardware configuration of the computing system being restored, at least one driver utilized by the hardware configuration, (3) a representation module, stored in memory, that represents the system volume as an image to a DISM application, (4) an injection module, stored in memory, that causes the DISM application to inject the driver into the computing system as part of the restore operation, and (5) at least one physical processor configured to execute the identification module, the location module, the representation module, and the injection module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) identify a restore operation directed to restoring a system volume on a computing system, (2) locate, at least in part by examining a hardware configuration of the computing system being restored, at least one driver utilized by the hardware configuration, (3) represent the system volume as an image to a DISM application, and (4) cause the DISM application to inject the driver into the computing system as part of the restore operation.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for injecting drivers into computing systems during restore operations. As will be explained in greater detail below, by representing a to-be-restored system volume as an image to a DISM application that is built into a target device's operating system, the disclosed systems may enable the DISM application to inject the drivers that are required by the system volume for successful operation during (as opposed to prior to) the restore operation itself. In addition, because this driver-injection process occurs after the system volume has already been deployed to the target device, this driver-injection process may, in effect, represent a hardware-agnostic process that avoids the need for driver-specific and/or operating-system-specific code. This may in turn simplify the restore process, reduce the chances of incorrect injection of drivers, and improve the chances of successful disaster recovery.

Figure 1:
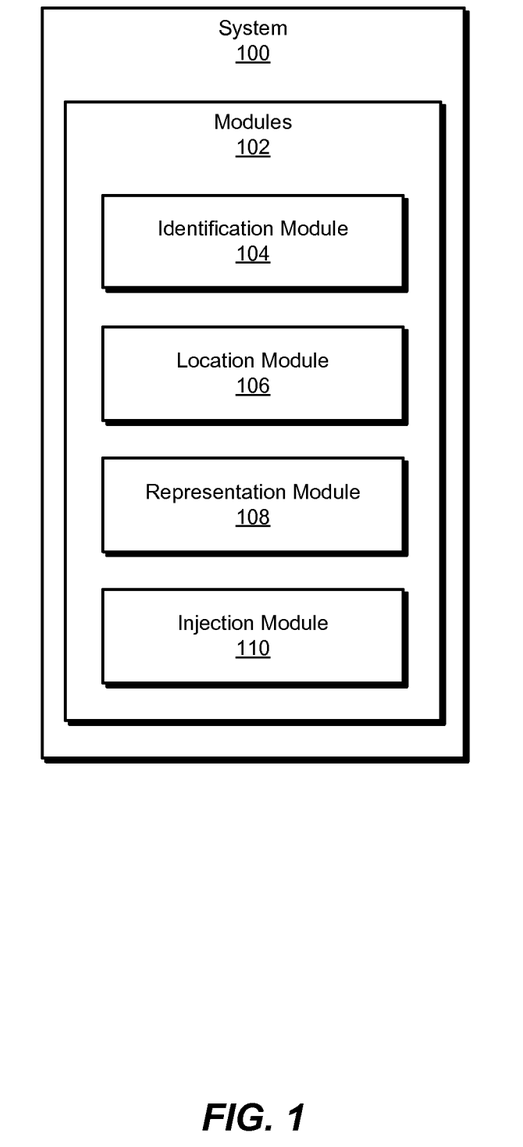
FIG. 1 is a block diagram of an exemplary system for injecting drivers into computing systems during restore operations.
Figure 2:
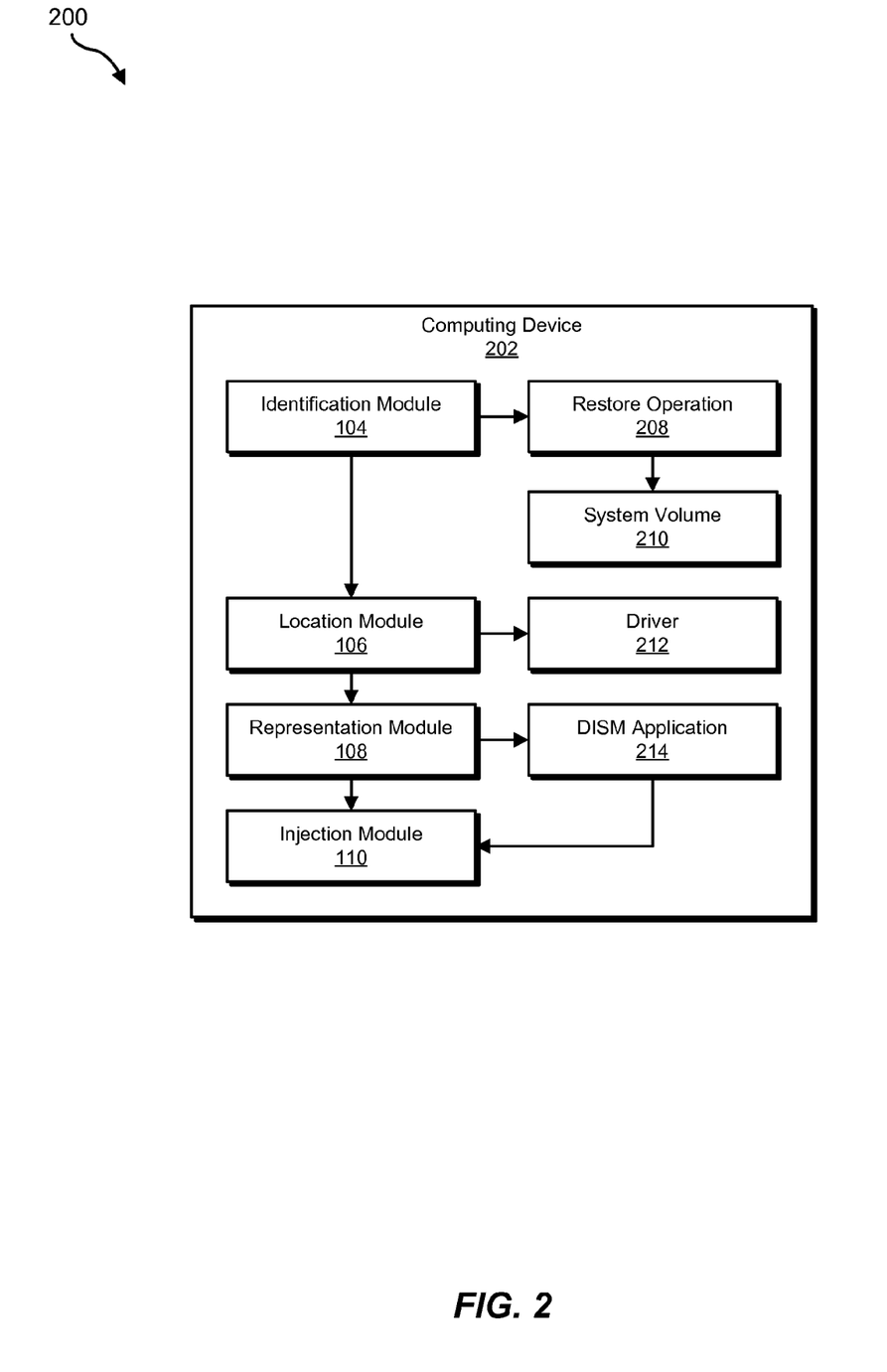
FIG. 2 is a block diagram of an additional exemplary system for injecting drivers into computing systems during restore operations.
Figure 4:
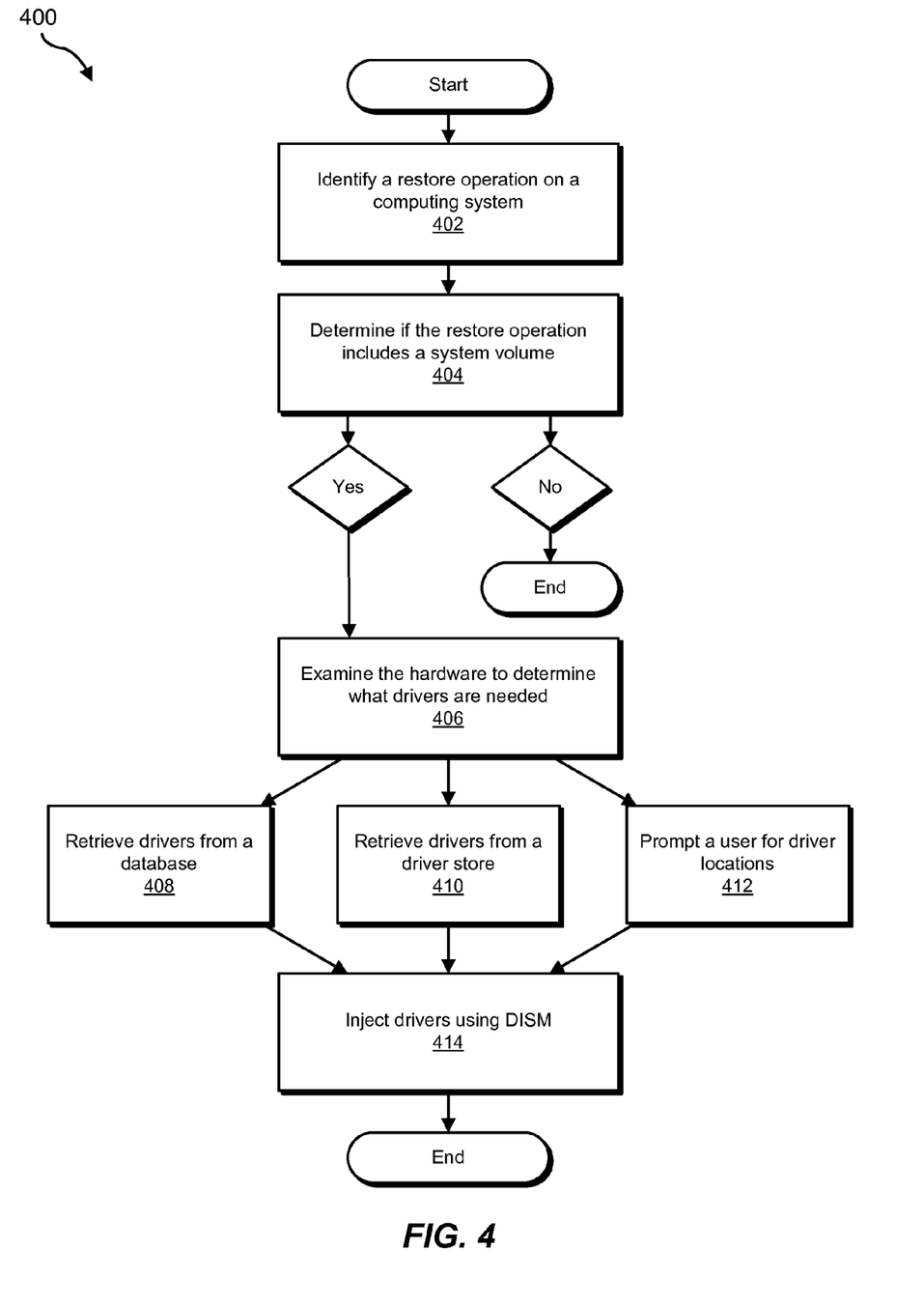
FIG. 4 is a flow diagram of an exemplary method for injecting drivers into computing systems during restore operations.
Figure 5:
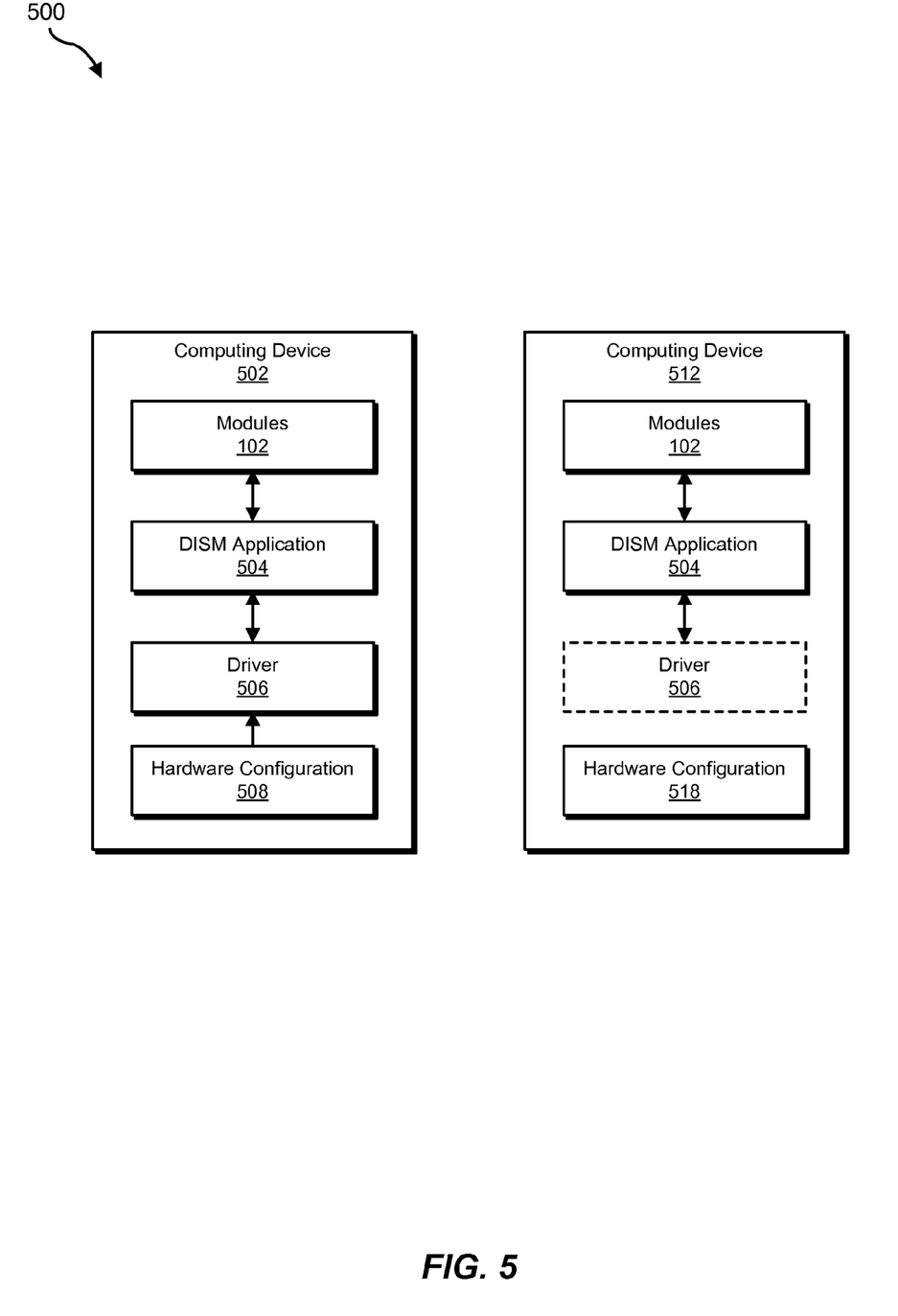
FIG. 5 is a block diagram of an exemplary computing system for injecting drivers into computing systems during restore operations.

The following will provide, with reference to FIGS. 1, 2, and 5, detailed descriptions of exemplary systems for injecting drivers into computing systems during restore operations. Detailed descriptions of corresponding computer-implemented methods will also be provided in connection with FIGS. 3 and 4. In addition, detailed descriptions of an exemplary computing system and network architecture capable of implementing one or more of the embodiments described herein will be provided in connection with FIGS. 6 and 7, respectively.

FIG. 1 is a block diagram of exemplary system 100 for injecting drivers into computing systems during restore operations. As illustrated in this figure, exemplary system 100 may include one or more modules 102 for performing one or more tasks. For example, and as will be explained in greater detail below, exemplary system 100 may include an identification module 104 that may identify a restore operation directed to restoring a system volume on a computing system. Exemplary system 100 may additionally include a location module 106 that may locate, at least in part by examining a hardware configuration of the computing system being restored, at least one driver utilized by the hardware configuration.

Exemplary system 100 may also include a representation module 108 that may represent the system volume as an image to a DISM application. Exemplary system 100 may additionally include an injection module 110 that may cause the DISM application to inject the driver into the computing system as part of the restore operation. Although illustrated as separate elements, one or more of modules 102 in FIG. 1 may represent portions of a single module or application. In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as computing device 202 in FIG. 2, computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202. In one example, computing device 202 may be programmed with one or more of modules 102.

In one embodiment, one or more of modules 102 from FIG. 1 may, when executed by at least one processor of computing device 202, enable computing device 202 to inject drivers into computing systems during restore operations. For example, and as will be described in greater detail below, identification module 104 may identify a restore operation 208 directed to restoring a system volume 210 on computing device 202. Next, location module 106 may locate, at least in part by examining a hardware configuration of computing device 202, at least one driver 212 utilized by the hardware configuration. After driver 212 has been located, representation module 108 may represent system volume 210 as an image to a DISM application 214 within an operating system installed on computing device 202. Finally, injection module 110 may cause DISM application 214 to inject driver 212 into computing device 202 as part of restore operation 208.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Figure 3:
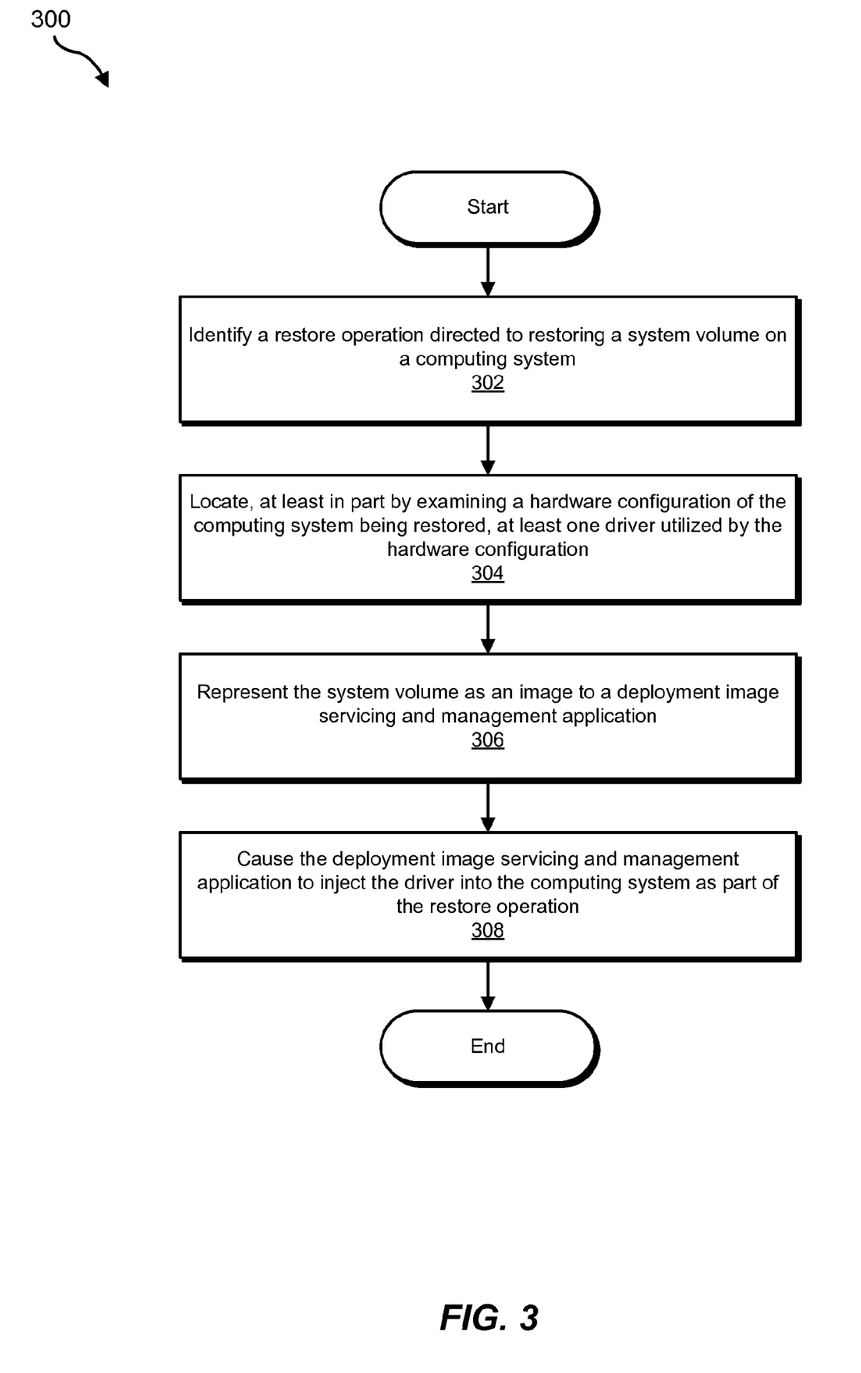
FIG. 3 is a flow diagram of an exemplary method for injecting drivers into computing systems during restore operations.

FIG. 3 is a flow diagram of an exemplary computer-implemented method 300 for injecting drivers into computing systems during restore operations. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 610 in FIG. 6, and/or portions of exemplary network architecture 700 in FIG. 7.

As illustrated in FIG. 3, at step 302 one or more of the systems described herein may identify a restore operation directed to restoring a system volume on a computing system. For example, identification module 104 may, as part of computing device 202 in FIG. 2, identify a restore operation 208 directed to restoring a system volume 210 on computing device 202.

The term "restore operation," as used herein, generally refers to any operation directed to restoring previously stored data, applications, and/or operating systems to a computing system, regardless of whether the data, applications, and/or operating systems were previously stored on the computing system that is the target of the restore operation. In some examples, a restore operation may be used to restore a computing system to a previous state held by the computing system.

Identification module 104 may identify the restore operation in a variety of ways and/or contexts. For example, identification module 104 may identify a restore operation directed to restoring a personal computer. In another example, identification module 104 may identify a restore operation launched from a server to restore an enterprise computer. In some embodiments, identification module 104 may execute as part of the restore application that is processing the restore operation.

The term "system volume," as used herein, generally refers to any storage container used to store files that are critical to starting an operating system. In some examples, a system volume may include a disk volume that includes operating-system and/or hardware-specific files, such as device drivers. For example, a WINDOWS system volume may include a variety of operating-system and/or hardware-specific files, such as a Boot.ini file and/or Boot Configuration Data.

In some examples, identification module 104 may determine that the restore operation is directed to restoring a system volume by detecting, on the system volume, a file structure that is characteristic of system volumes. For example, identification module 104 may detect a WINDOWS folder, a system volume information folder, a boot folder, a boot file, and/or a combination of folders and/or files typically found on system volumes.

At step 304, one or more of the systems described herein may locate, at least in part by examining a hardware configuration of the computing system being restored, at least one driver utilized by the hardware configuration. For example, location module 106 may, as part of computing device 202 in FIG. 2, locate, at least in part by examining a hardware configuration of computing device 202, at least one driver 212 utilized by the hardware configuration.

The term "hardware configuration," as used herein, generally refers to any type or form of information that describes and/or details the devices that are attached to or that make up a computing system. For example, a hardware configuration for a computing system may include information that identifies each device that is attached to or that forms a part of the computing system and, for each device, the device's configuration or version, how the device interacts with the computing system's operating system, the device's type, etc. Examples of such devices include, without limitation, a hardware device, a peripheral, and/or a virtual device.

The term "device driver" or "driver," as used herein, generally refers to any script, application, software, and/or set of instructions for interfacing between a device and an operating system. In some examples, a driver may communicate with a device through a communications subsystem in the computing system. In addition, a driver may be specific to a device and/or an operating system.

Location module 106 may locate the driver in a variety of ways. In one example, location module 106 may locate the driver by locating an identifier of the driver in a driver database and then retrieving the driver from the driver database. An identifier of the driver may include a name of the driver, an identifier of a vendor of the driver, a version number of the driver, and/or a numerical identifier of the driver. In some embodiments, the driver database may be located on the computing system being restored. In other embodiments, the driver database may be stored on a server on a local network and/or on the Internet.

In some examples, location module 106 may locate the driver by retrieving the driver from a driver store maintained by a restore application that is performing the restore operation. In some embodiments, the restore application may maintain the driver store by storing driver information during the creation of system restore points.

Additionally or alternatively, location module 106 may locate the driver by prompting a user for a location of the driver. For example, location module 106 may prompt the user to connect a storage device that stores a copy of the driver, enter a location on the computing system and/or the network where the driver may be downloaded, and/or enter a location on the Internet where the driver may be downloaded.

In some embodiments, location module 106 may examine the hardware configuration of the computing system during the restore operation. In these embodiments, the systems described herein may have no previous information about the hardware configuration of the computing system before location module 106 examines the same during the restore operation.

For example, location module 106 may examine the hardware configuration of the target computing system during the restore operation, which occurs after the system volume has already been deployed to the computing system. In this example, the computing system may have a specific hardware configuration that requires a particular driver. As such, the restore operation may have no information about this specific hardware configuration or particular driver until after location module 106 has examined the computing system's hardware. Because location module 106 may examine the hardware configuration at restore time, the restore operation and/or driver-injection applications may be written in a hardware-agnostic manner.

In one embodiment, the performance of step 304 may be contingent on determining that the restore operation identified in step 302 is directed to restoring a system volume and not a data volume. For example, if identification module 104 determines that the restore operation identified in step 302 is directed to restoring a data volume, the systems described herein may not operate on the data volume and/or may not inject drivers into the volume that is being restored.

At step 306, one or more of the systems described herein may represent the system volume as an image to a DISM application. For example, representation module 108 may, as part of computing device 202 in FIG. 2, represent system volume 210 as an image to a DISM application 214 that is part of an operating system installed on computing device 202.

The term "image," as used herein, generally refers to any representation of the state of a computing system. In some examples, an image may include the complete contents and structure of a computing system and/or data storage device. Examples of images include, without limitation, system deployment images, virtual hard drive files, and/or WINDOWS imaging (WIM) files.

The term "deployment image servicing and management application" or "DISM application," as used herein, generally refers to any tool used to manipulate, configure, and/or service offline images that have not yet been deployed. In some examples, a DISM application may be used to install, uninstall, configure, and/or update operating system features, packages, drivers, and/or settings before image deployment. An example of a DISM application may include the DISM.exe command line tool on WINDOWS operating systems.

Representation module 108 may represent the system volume as an image to the DISM application in a variety of ways. For example, representation module 108 may represent the system volume as a WIM file to an application programming interface (API) provided by the DISM application. In some examples, representation module 108 may represent the system volume as an image to the DISM application by wrapping the system volume in a wrapper that mimics an image file. Additionally or alternatively, representation module 108 may fill out one or more fields in a call to a DISM API in a manner that indicates that the DISM API should expect an image file.

In some embodiments, representation module 108 may represent the system volume as a WIM file because the DISM application may be unable to inject drivers into system volumes and/or may be configured to only inject drivers into WIM files. Thus, by representing the system volume as a WIM file, representation module 108 may enable the DISM application to directly interact with and inject drivers into the system volume, potentially avoiding the need for driver-specific and/or operating-system-specific code.

At step 308, one or more of the systems described herein may cause the DISM application to inject the driver into the computing system as part of the restore operation. For example, injection module 110 may, as part of computing device 202 in FIG. 2, cause the DISM application to inject driver 212 into computing device 202 as part of restore operation 208.

Injection module 110 may cause the DISM application to inject the driver in a variety of ways and/or contexts. For example, injection module 110 may cause the DISM application to inject the driver by interacting with the DISM application via an API. In this example, injection module 110 may send the DISM application instructions via the DISM API to configure the system volume with the driver.

As detailed above, in some embodiments, location module 106 may locate the driver in question after the system volume has already been deployed to the computing system that is being restored. In these embodiments, injection module 110 may also cause the DISM application to inject the driver into the computing system after the system volume has already been deployed to the computing system, such that the steps of locating and injecting the driver are performed in a hardware-agnostic manner. For example, a system volume may be deployed to a computing system with a specific hardware configuration that requires a particular driver. In this example, the systems described herein may have no information about the specific hardware configuration or the particular driver until after location module 106 has examined the hardware (which, as detailed above, may only occur after the system volume has already been deployed). In this example, injection module 110 may then use the hardware configuration information and/or driver information from location module 106 to inject the driver into the computing system, even though injection module 110 was not previously configured to handle the specific hardware configuration of the computing system in question. The method described above is different from traditional methods that involve injecting drivers into images before deployment, thus requiring detailed assumptions about hardware configurations that may prove to be incorrect.

In some examples, an incorrect driver may be injected despite the efforts detailed above. Accordingly, in one embodiment the systems described herein may include (1) determining that the driver represents an incorrect driver for the hardware configuration, (2) automatically restarting the restore operation, (3) locating a correct driver for the hardware configuration, and (4) causing the DISM application to inject the correct driver. For example, during step 304 a user may have specified an incorrect driver for the hardware configuration. The computing system may fail to boot properly after the restore operation if an incorrect driver is used in place of the correct driver. In this example, the systems described herein may detect the incorrect driver and may automatically restart the restore operation so that the correct driver may be found and the restore operation may succeed.

The systems described herein may operate in a variety of ways. FIG. 4 is a flow diagram of an exemplary method 400 for injecting drivers into computing systems during restore operations. As illustrated in FIG. 4, at step 402 the systems described herein may identify a restore operation on a computing system. For example, identification module 104 may, as part of a restore application running on computing device 202 in FIG. 2, identify an attempt by the restore application to restore system volume 210 to computing device. At step 404, the systems described herein may determine if the restore operation is directed to restoring a system volume. For example, identification module 104 may determine that system volume 210 is a target of restore operation 208. If the restore operation is not directed to restoring a system volume, the involvement of the systems described herein in the restore operation may come to an end.

If the restore operation is directed to a system volume, at step 406 the systems described herein may examine the hardware configuration to determine what drivers are needed. For example, location module 106 may, as part of a restore application running on computing device 202 in FIG. 2, examine any or all hardware connected to computing device 202. The systems described herein may then retrieve the drivers in any or all of a number of ways.

At step 408, the systems described herein may retrieve the drivers from a database. At step 410, the systems described herein may retrieve the drivers from a driver store. Additionally or alternatively, at step 412 the systems described herein may prompt a user for driver locations. In some examples, location module 106 may retrieve the drivers in any or all of the ways described above. After the drivers have been retrieved, the systems described herein may inject the drivers using a DISM application at step 414. In some embodiments, the systems described herein may represent the system volume as an image file to a DISM API. For example, representation module 108 may, as part of a restore application running on computing device 202 in FIG. 2, represent system 210 volume as an image to DISM application 214 and injection module 110 may cause DISM application 214 to inject driver 212 into the computing system.

Before, after, and/or in lieu of injecting drivers into the computing system, the systems described herein may remove at least one driver from the computing system. In one example, the systems described herein may identify an additional restore operation on an additional computing system, determine that the additional computing system includes a different hardware configuration that does not utilize the driver, and remove, as part of the additional restore process, the driver that is not utilized by the different hardware configuration. In another example, the hardware configuration of a computing system may have changed since a restore image was taken and may no longer make use of all the drivers included in the restore image. FIG. 5 is a block diagram of an exemplary computing system 500 for injecting drivers into computing systems during restore operations. As illustrated in FIG. 5, computing device 502 may include modules 102, DISM application 504, driver 506, and/or hardware configuration 508. Computing device 512 may include modules 102, DISM application 504, driver 506, and/or hardware configuration 518. In some examples, hardware configuration 518 may not require driver 506. In this example, modules 102 may use DISM application 504 to remove unnecessary driver 506 from computing device 512. In some examples, modules 102 may remove drive 506 from computing device 512 as part of a restore operation.

As described above in connection with method 300, the systems described herein may inject drivers into a computing system during a restore operation by representing a system volume as an image to a DISM application. Representing the system volume as an image may allow the systems described herein to take advantage of the fact that the DISM application is a part of the target system's operating system, such that the restore application does not need to know the precise configuration of the system's registry in order to successfully inject the drivers. Using the DISM application in this way may also enable the systems described herein to inject drivers more accurately while being written in a hardware-agnostic fashion that may allow for increased flexibility.

Figure 6:
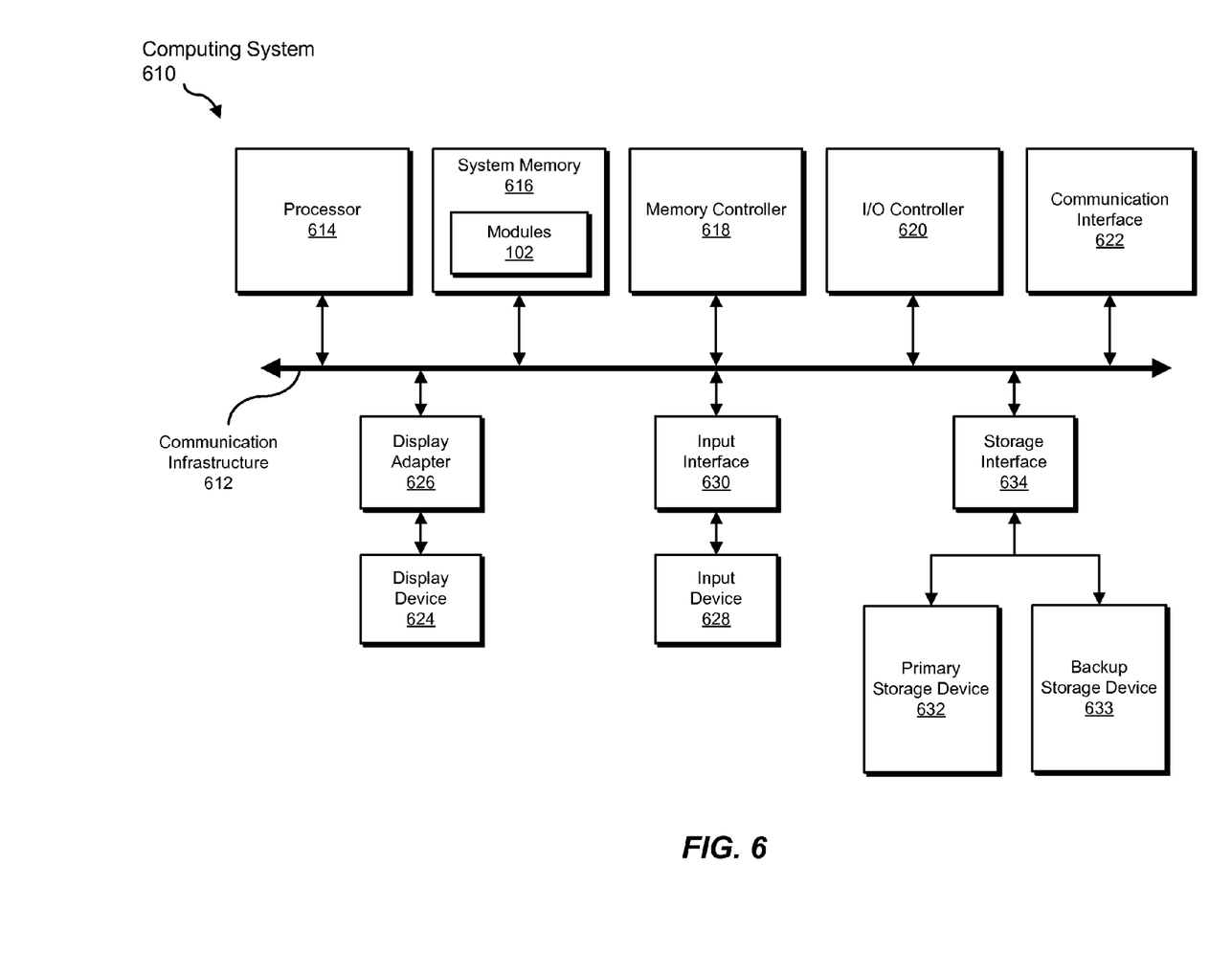
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
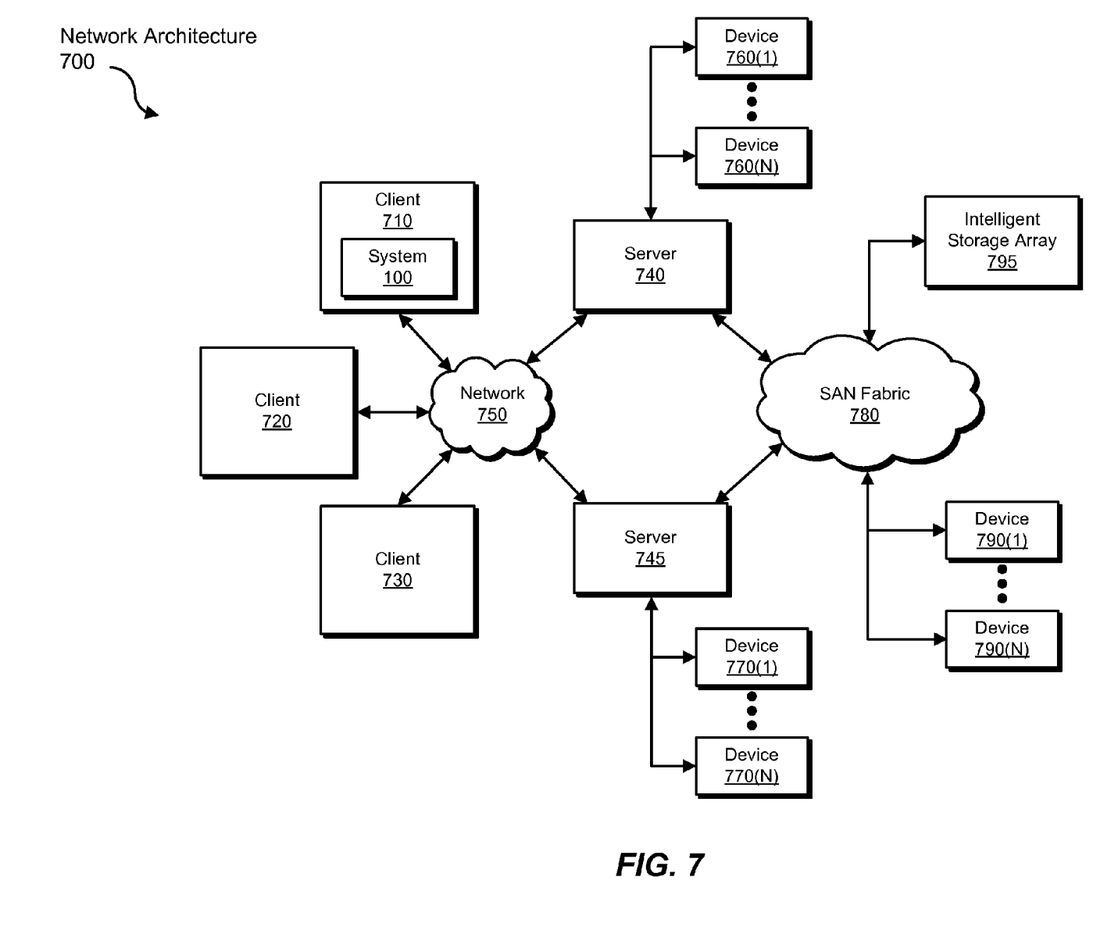
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790 (1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for injecting drivers into computing systems during restore operations.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/ or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive restore operation data to be transformed, transform the restore operation data, output a result of the transformation to a DISM application, use the result of the transformation to inject drivers into a system volume, and store the result of the transformation to a computing device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for injecting drivers into computing systems during restore operations, at least a portion of the method being performed by a computing device comprising at least one processor, the method comprising:
    identifying a restore operation directed to restoring a system volume on a computing system;
    locating, at least in part by examining a hardware configuration of the computing system being restored, at least one driver utilized by the hardware configuration;
    representing the system volume as an image to a deployment image servicing and management application;
    causing the deployment image servicing and management application to inject the driver into the computing system as part of the restore operation.

2. The computer-implemented method of claim 1, wherein locating the driver comprises locating an identifier of the driver in a driver database and retrieving the driver from the driver database.

3. The computer-implemented method of claim 1, wherein locating the driver comprises retrieving the driver from a driver store maintained by a restore application that is performing the restore operation.

4. The computer-implemented method of claim 1, wherein locating the driver comprises prompting a user for a location of the driver.

5. The computer-implemented method of claim 1, wherein examining the hardware configuration of the computing system comprises examining the hardware configuration during the restore operation.

6. The computer-implemented method of claim 1, wherein identifying the restore operation directed to restoring the system volume comprises detecting, on the system volume, a file structure that is characteristic of the system volume.

7. The computer-implemented method of claim 1, wherein causing the deployment image servicing and management application to inject the driver comprises interacting with the deployment image servicing and management application via an application programming interface.

8. The computer-implemented method of claim 1, further comprising:
    determining that the driver represents an incorrect driver for the hardware configuration;
    automatically restarting the restore operation;
    locating a correct driver for the hardware configuration;
    causing the deployment image servicing and management application to inject the correct driver.

9. The computer-implemented method of claim 1, further comprising:
    identifying an additional restore operation on the computing system;

determining that the computing system comprises a different hardware configuration that does not utilize the driver;

removing, as part of the additional restore operation, the driver that is not utilized by the different hardware configuration.

10. The computer-implemented method of claim 1, wherein the step of causing the deployment image servicing and management application to inject the driver into the computing system occurs after deployment of the system volume to the computing system.

11. The computer-implemented method of claim 1, wherein the step of examining the hardware configuration occurs after deployment of the system volume to the computing system such that the steps of locating and injecting the driver are hardware agnostic.

12. The computer-implemented method of claim 1, wherein the step of locating the driver is contingent on determining that the restore operation is directed to restoring the system volume and not a data volume.

13. A system for injecting drivers into computing systems during restore operations, the system comprising:
 an identification module, stored in memory, that identifies a restore operation directed to restoring a system volume on a computing system;
 a location module, stored in memory, that locates, at least in part by examining a hardware configuration of the computing system being restored, at least one driver utilized by the hardware configuration;
 a representation module, stored in memory, that represents the system volume as an image to a deployment image servicing and management application;
 an injection module, stored in memory, that causes the deployment image servicing and management application to inject the driver into the computing system as part of the restore operation;
 at least one physical processor configured to execute the identification module, the location module, the representation module, and the injection module.

14. The system of claim 13, wherein:
 the location module locates the driver by locating an identifier of the driver in a driver database;
 the system further comprises a retrieval module, stored in memory, that retrieves the driver from the driver database.

15. The system of claim 13, wherein the location module locates the driver by retrieving the driver from a driver store maintained by a restore application that is performing the restore operation.

16. The system of claim 13, wherein the location module locates the driver by prompting a user for a location of the driver.

17. The system of claim 13, wherein the location module examines the hardware configuration of the computing system by examining the hardware configuration during the restore operation.

18. The system of claim 13, wherein the identification module identifies the restore operation directed to restoring the system volume by detecting, on the system volume, a file structure that is characteristic of the system volume.

19. The system of claim 13, wherein the injection module causes the deployment image servicing and management application to inject the driver by interacting with the deployment image servicing and management application via an application programming interface.

20. A non-transitory computer-readable medium comprising one or more computer-readable instructions that, when executed by at least one processor of a computing device, cause the computing device to:
 identify a restore operation directed to restoring a system volume on a computing system;
 locate, at least in part by examining a hardware configuration of the computing system being restored, at least one driver utilized by the hardware configuration;
 represent the system volume as an image to a deployment image servicing and management application;
 cause the deployment image servicing and management application to inject the driver into the computing system as part of the restore operation.

* * * * *